No. 839,221.　　　　　　　　　　　　　　　PATENTED DEC. 25, 1906.
J. SPŸKER.
UNIVERSAL JOINT FOR TRANSMISSION GEARS.
APPLICATION FILED DEC. 8, 1905.

Witnesses
J. M. Fowler Jr.
Ruth J. Mitchell

Inventor
Jacobus Spÿker
By Mason, Fenwick & Lawrence
Att'ys

UNITED STATES PATENT OFFICE.

JACOBUS SPŸKER, OF TROMPENBURG, NEAR AMSTERDAM, NETHERLANDS.

UNIVERSAL JOINT FOR TRANSMISSION-GEARS.

No. 839,221.　　　Specification of Letters Patent.　　　Patented Dec. 25, 1906.

Application filed December 8, 1905. Serial No. 290,946.

*To all whom it may concern:*

Be it known that I, JACOBUS SPŸKER, a subject of the Queen of the Netherlands, residing at Trompenburg, near Amsterdam, Netherlands, have invented new and useful Improvements in Universal Joints for Transmission-Gears, of which the following is a specification.

The present invention relates to a means of connecting the mechanism of change-speed gear with one or more motor-axles of automobiles.

The arrangement hereinafter described has been specially designed for the transmission of power from the change-speed gear on two sides to motor-axles front and rear.

The invention essentially consists in intercalating in the axis of transmission of the motor-axles universal joints and supports with universal joints and in arranging the forks of the universal joints which transmit the power in such a manner as to be independent of the moving axles and to be maintained by springs in the center of the sphere of the universal joint, so that the axles sliding in connection with the forks can recede with regard to the universal joint or can approach one another without the claws of this latter changing their position.

In order that this invention may be the better understood, I will now proceed to describe the same with reference to the drawings annexed hereto and to the letters marked thereon.

The drawings hereunto annexed represent one form of carrying out this system of connection.

Figure 1:
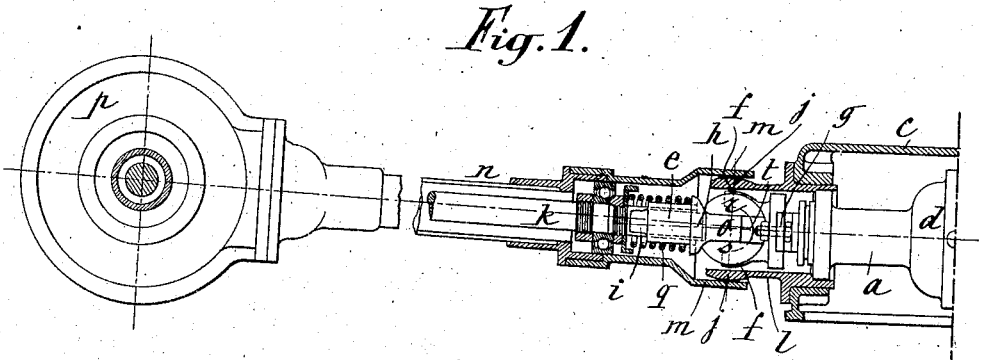
Figure 2:
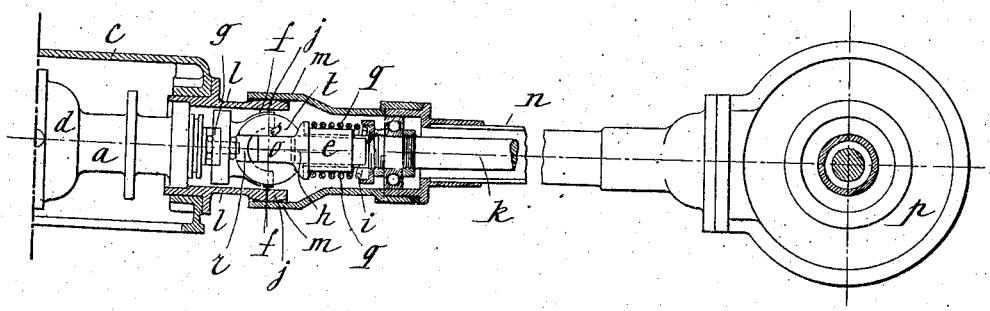
Figure 4:
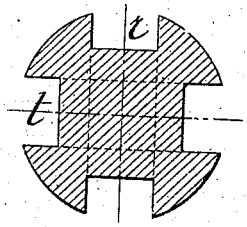
Figure 3:
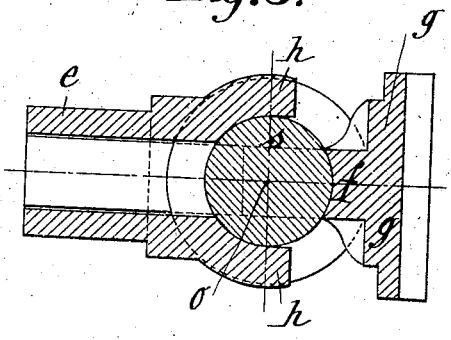

Figure 1 is a longitudinal section through one half of the change-speed gear and the transmission-gear going to the motor-axles. Fig. 2 is a longitudinal sectional view through the other half of the transmission-gear, the said half joining with the half shown in Fig. 1, as at the dotted vertical lines. Fig. 3 is a longitudinal section through the universal joint of the transmission-gear, and Fig. 4 is a transverse section of the sphere of the same.

The change-speed gear is inclosed within a box *c* of aluminium, which is formed in a single piece without joints to prevent the escape of oil therefrom. In this box are arranged the shafts for the change-speed gear. (Not shown in the drawings.) These shafts engage with gear-wheels of different diameters with a third shaft *a*, having a differential gear *d* upon it, if desired. This latter shaft *a* transmits the force toward two sides—*i. e.*, to the two motor-axles *p p* at the back and front. To effect this, each of the two extremities of the axle *a* terminate with a claw *g*, with which the circular fork *f* is adapted to engage in a rectangular groove *r* in a sphere *s*, concentric with the center *o* of the fork *f*. The sphere *s* has a second rectangular groove *t* perpendicular to the first, which engages a second claw *h* of similar form to the first. The second claw *h* is provided with a neck *e*, which has a square hole to receive the end *i* of the pinion-shaft *k*. The claw ought to be maintained in place in the middle of the sphere, so that the center of articulation does not displace itself. To obtain this result, according to the present invention a strong spring *q* is arranged, acting either way in the double sense. This spring comes into action under the movement produced from the springs of the carriage. It maintains the claw in place continuously and sets up at the same time a continuous lubrication for the effective operation of all the parts. The box with these two means of transmissions has two tubes *l*, with the exterior of zonary form, so as to provide an exterior support having the same center *o* as the interior articulation. These tubes *l*, with the exterior spherical portion *j*, constitute a support for a tube *m*, which forms a dust-proof cover and at the same time a grease-box. The interior part of the tube *m*, of tempered steel, lies upon the exterior spherical part *j* of the tube *l* in such a manner that whatever may be the displacement of the axle *p*, and in consequence of the tube-support *n*, the axis of the shaft *k* always passes through the center *o*.

By reason of the before-described arrangements the force set up by the displacement of the parts acts entirely upon the two non-turning parts *l* and *m*, and there is no other force or shock transmitted to the axles which transmit the force of the motor. As a consequence there is no loss of energy, and, further, the lubrication is assured in a perfect condition and all the mechanism of transmission is absolutely protected from the dust.

Having now described my invention, what I claim, and desire to secure by Letters Patent, is—

1. In a universal joint for transmission-gears, a transmitting mechanism interposed between the power and the driven shaft, a universal joint in the transmission mechanism, a support having a universal joint, and means for connecting the power-transmission universal joint with the axle it drives, adapted to permit a sliding motion between the two.

2. In a universal joint for power-transmissions, a transmitting mechanism disposed between the driving and driven parts, a universal joint intercalated in the transmission mechanism, a support for the transmitting mechanism having a universal joint, means for connecting the power-transmitting universal joint with the axle it drives, a grease-casing for the transmitting mechanism apart from the casing containing the speed-gear, the said casing consisting of a tube having a zonary external surface, a tube having a surface formed and adapted to movably coact with the said internal tube, the zonary surface being concentric with the power-transmitting universal joint.

3. Means for connecting the change-speed gear with the motor-axles of motor-vehicles consisting of a transmitting mechanism interposed between the axle and gear, a support, a universal joint carried by the support, a universal joint intercalated in said support, means for connecting the power-transmitting universal joint with the axle it drives adapted to permit a sliding motion between the parts, a spiral spring arranged to maintain the parts in proper position and at the same time to distribute a lubricant contained in the casing of the universal joint.

In testimony whereof I have signed my name to this specification in the presence of two subscribing witnesses.

JACOBUS SPŸKER.

Witnesses:
   WILHELMUS JOHANNES VAN DEN BRINK,
   AUGUST SIEGFRIED DOCEN.